US006731611B1

(12) United States Patent
Schenk

(10) Patent No.: US 6,731,611 B1
(45) Date of Patent: May 4, 2004

(54) METHOD FOR DUPLEX DATA TRANSMISSION WITH QAM AND DEMODULATOR FOR USE IN THE METHOD

(75) Inventor: Heinrich Schenk, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/408,475

(22) Filed: Sep. 28, 1999

(30) Foreign Application Priority Data

Sep. 28, 1999 (DE) .......................... 198 44 457

(51) Int. Cl.[7] .............................................. H04B 1/56
(52) U.S. Cl. ...................... 370/276; 370/295; 370/320
(58) Field of Search ................................. 370/276, 281, 370/282, 295, 302, 478

(56) References Cited

U.S. PATENT DOCUMENTS

| 3,937,882 | A | * | 2/1976 | Bingham | 370/276 |
| 4,236,244 | A | * | 11/1980 | Strehl | 370/295 |
| 5,930,309 | A | * | 7/1999 | Knutson et al. | 375/340 |
| 6,002,722 | A | * | 12/1999 | Wu | 375/295 |
| 6,178,161 | B1 | * | 1/2001 | Terry | 370/276 |
| 6,333,920 | B1 | * | 12/2001 | Nguyen et al. | 370/281 |

FOREIGN PATENT DOCUMENTS

| DE | 29 21 780 B2 | 12/1980 |
| DE | 38 88 336 T2 | 3/1994 |
| DE | 37 51 526 T2 | 9/1995 |
| DE | 44 08 334 A1 | 9/1995 |

OTHER PUBLICATIONS

"Message Transmission" (Kammeyer), B.G. Teubner, Stuttgart, 1996, pp. 370–373.

* cited by examiner

*Primary Examiner*—Chi Pham
*Assistant Examiner*—Nhat Do
(74) *Attorney, Agent, or Firm*—Laurence A. Greenberg; Werner H. Stemer; Ralph E. Locher

(57) ABSTRACT

The system has a demodulator for duplex data transmission with quadrature amplitude modulation via two conductors with two oppositely transporting channels. The channels include an "upper" channel with a higher frequency band $f_o \pm B_o/2$ and a "lower" channel with a lower frequency band $f_u \pm B_u/2$. The two frequency bands do not overlap each other. Each of the channels transmits two digital signals at a respective symbol frequency $f_T$, and the received modulated carrier signal is so sampled at a sampling frequency $f_{Ao}$ in the case of the upper channel and $f_{Au}$ in the case of the lower channel, respectively. The frequencies are chosen in such a way that $f_o/f_u$ is a rational number K and $f_{Ao} = 2f_o$.

13 Claims, 9 Drawing Sheets

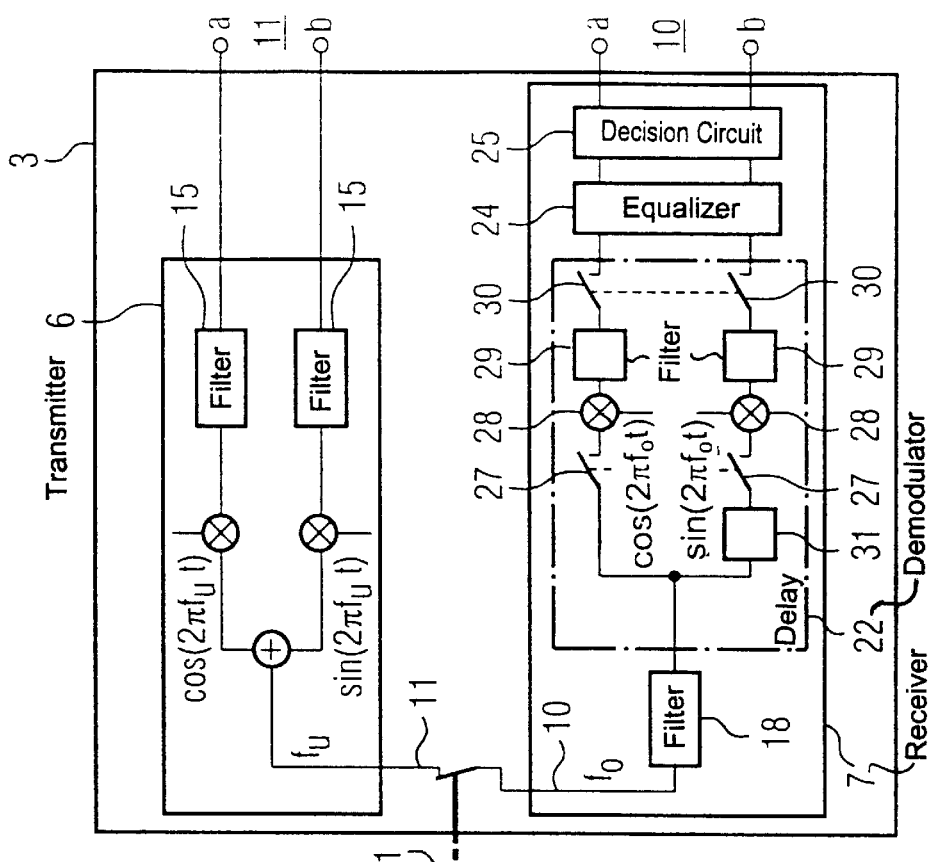
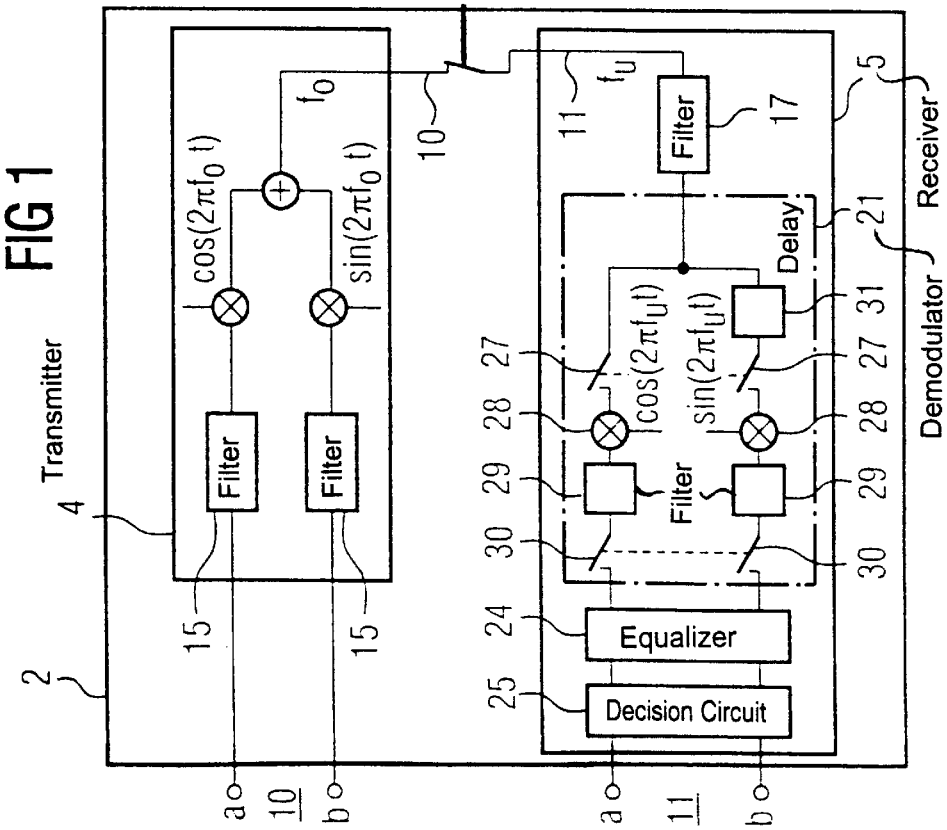
FIG 1

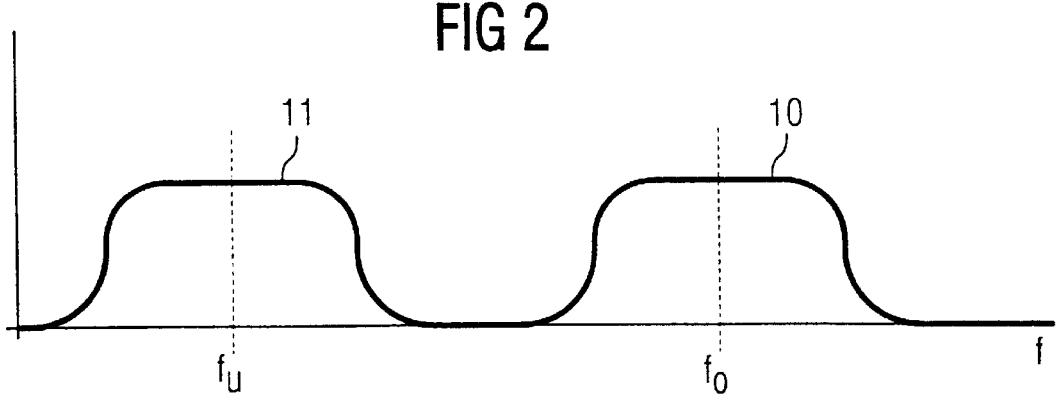
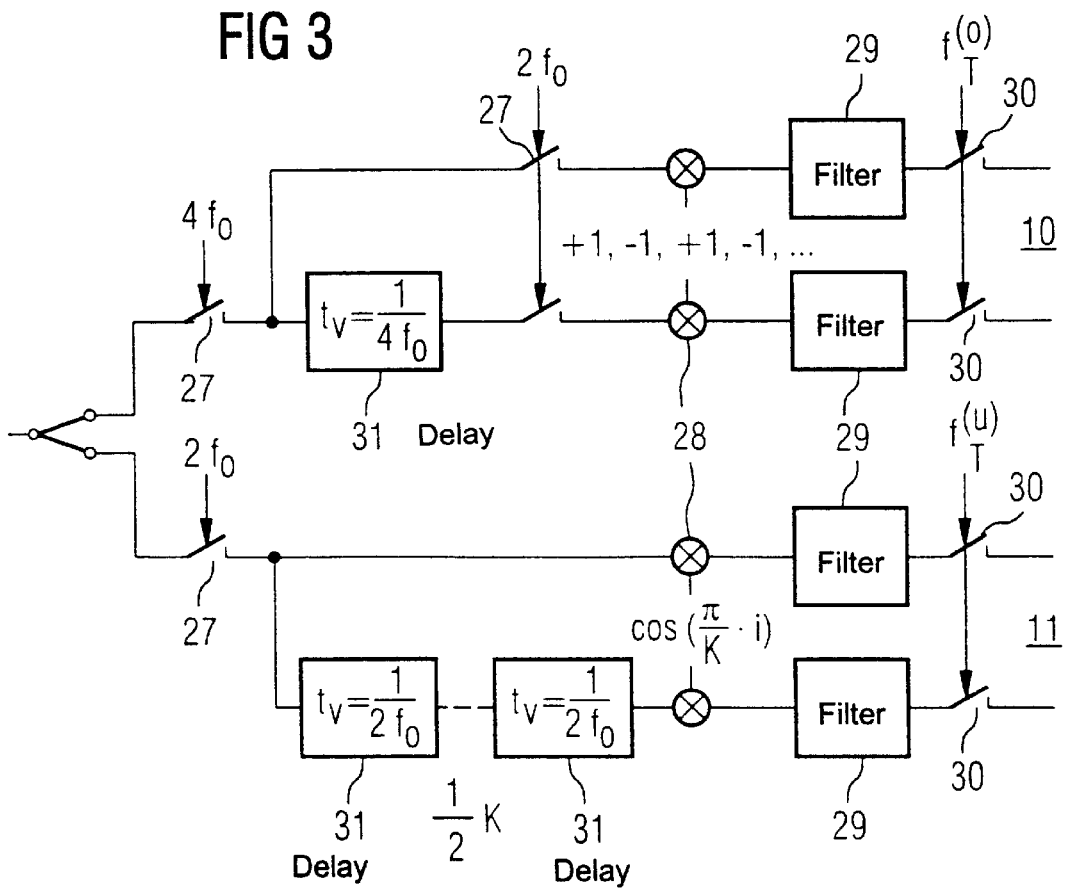

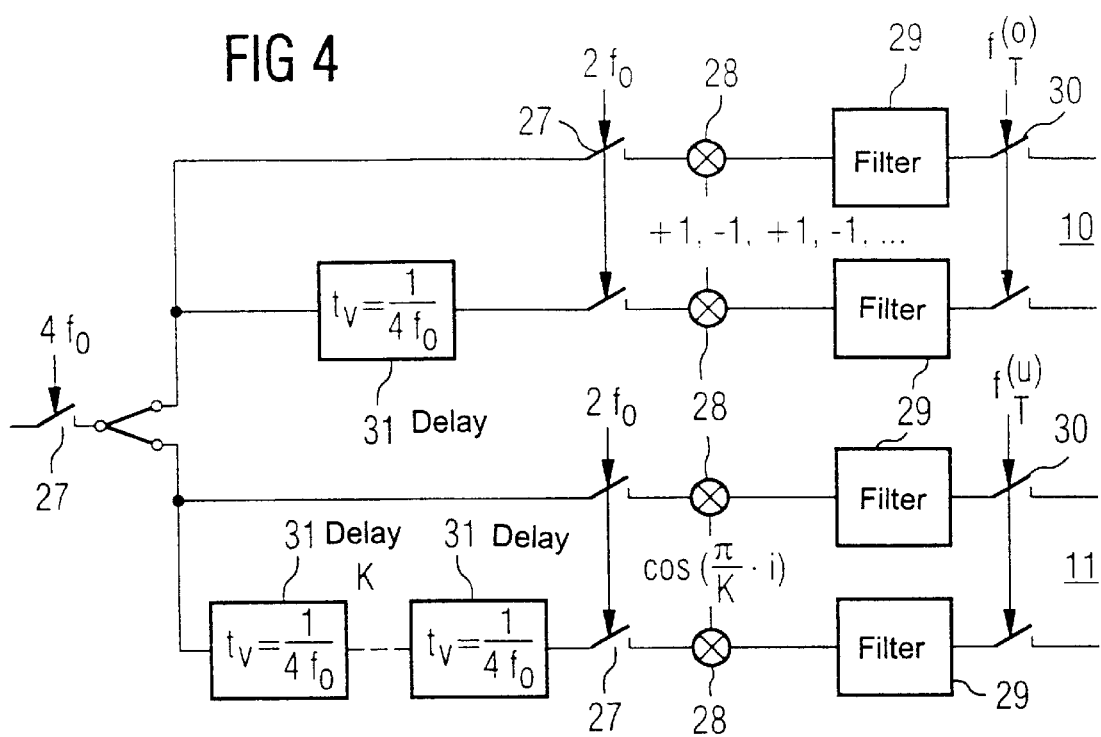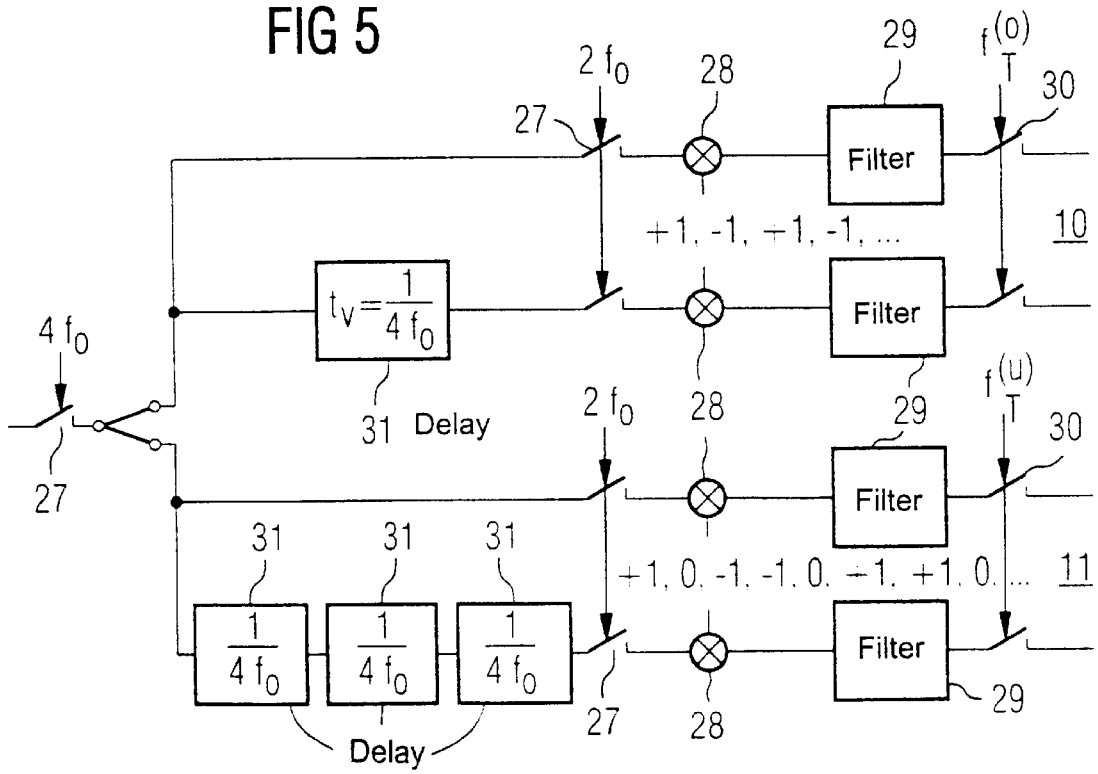

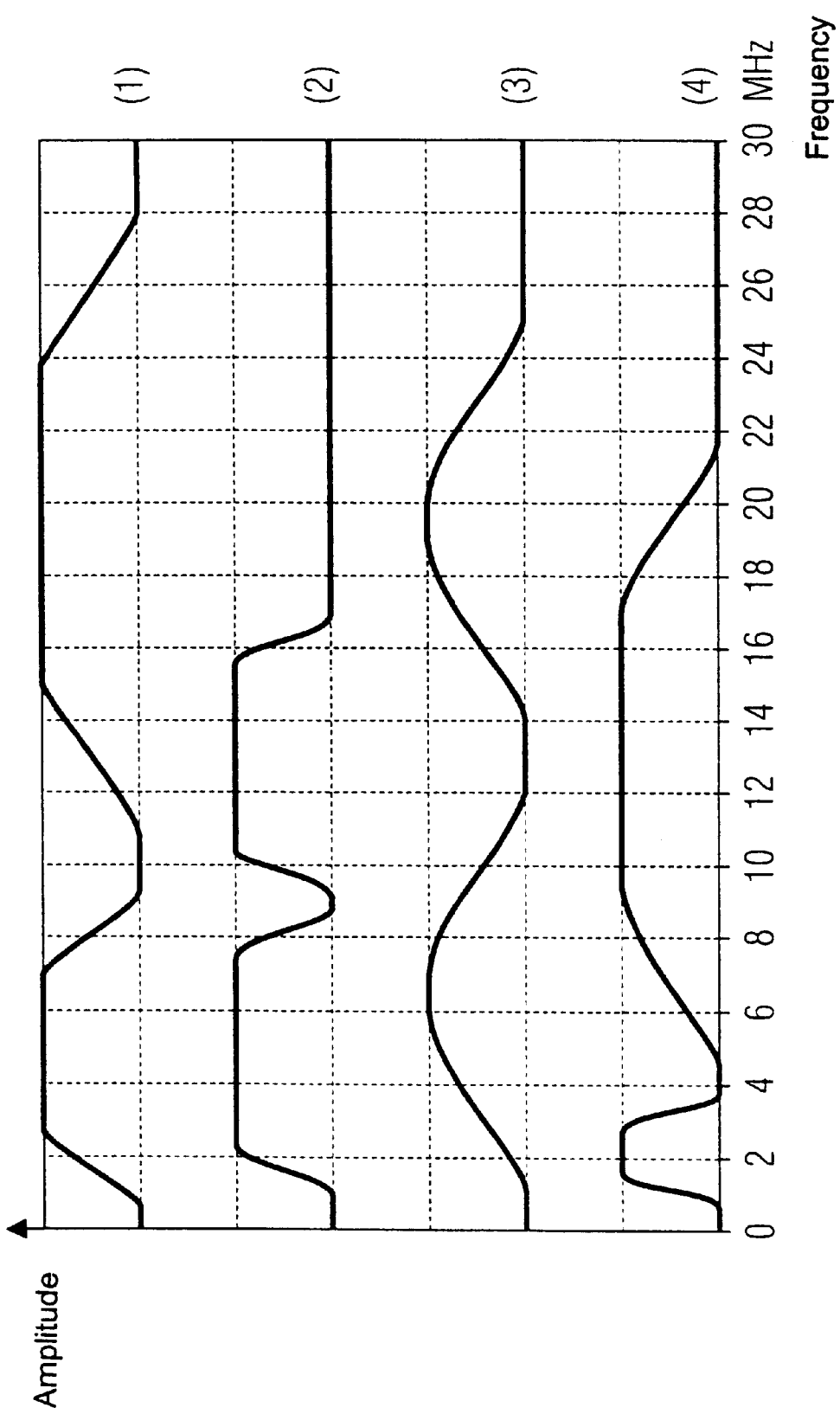

FIG 7
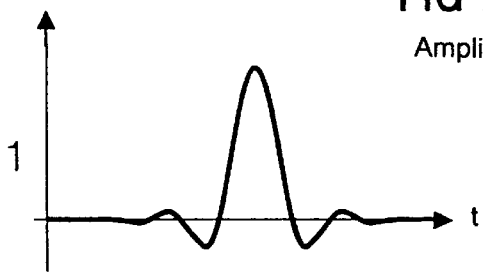
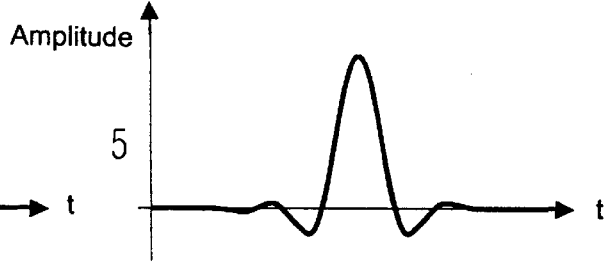
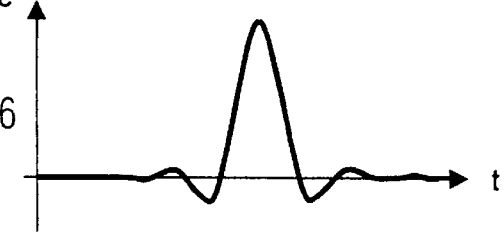
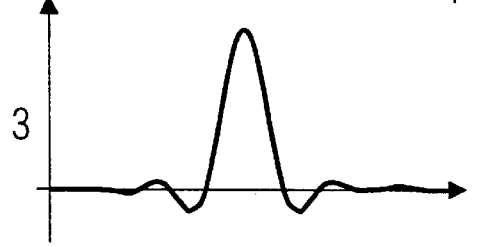
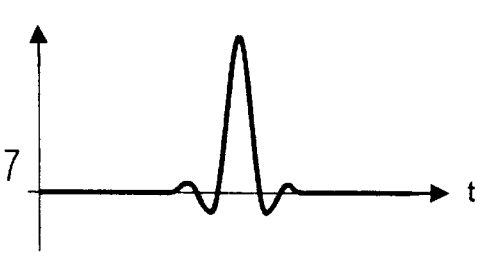
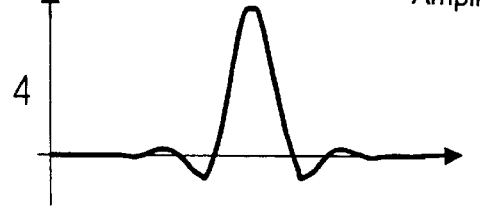
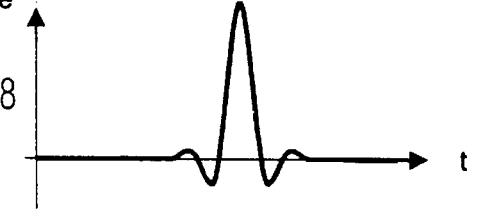

METHOD FOR DUPLEX DATA TRANSMISSION WITH QAM AND DEMODULATOR FOR USE IN THE METHOD

BACKGROUND OF THE INVENTION

1. Field of the Invention

The invention relates to a method for duplex data transmission with quadrature amplitude modulation (QAM) via two conductors using the time division multiplex and frequency division multiplex method of two oppositely transporting channels. The transmission is in a first direction via an "upper" channel with a higher frequency band $f_o \pm B_o/2$ and, in a second direction, via a "lower" channel with a lower frequency band $f_u \pm B_u/2$, which does not overlap the higher frequency band. Each of the channels transports two digital signals, namely a normal and a quadrature data signal, at a respective symbol frequency $f_T$, which may be identical or different for the two channels. The system further performs at both ends modulation of a carrier signal with the two digital data signals for the purpose of transmission, and sampling of the received modulated carrier signal at a sampling frequency $f_{Ao}$ in the case of the upper channel and $f_{Au}$ in the case of the lower channel, respectively. The pulse train resulting from the sampling is subsequently demodulated, which is followed by low-pass filtering and sampling at the symbol frequency of the data signal for the purpose of recovering the two digital data signals used for modulation at the other end. The following frequencies are defined:

$f_o$=center frequency of the two upper channels;

$B_o$=bandwidth of the upper channels;

$f_u$=center frequency of the lower channels;

$B_u$=bandwidth of the lower channels;

$f_T$=symbol frequency of the digital data signal;

$f_{Ao}$=sampling frequency of the receiver-end sampling of the upper channel prior to demodulation;

$f_{Au}$=sampling frequency of the receiver-end sampling of the lower channel prior to demodulation;

and the following inequalities hold true:

$$f_o > f_u;\ f_{Ao} > f_T;\ \text{and}\ f_{Au} > f_T.$$

The invention furthermore relates to a demodulator for use in a preferred embodiment of the method according to the invention, having a respective demodulation path for the normal signal and the quadrature signal. The demodulator has a first sampler for sampling at a sampling frequency, a multiplier for multiplication by a cyclic signal, a low-pass filter, and a second sampler for sampling at the symbol frequency.

In the case of duplex data transmission via two-wire lines, the transmission is interfered with to an increasing extent by near-end crosstalk as the speed increases. This is due to the fact that near-end crosstalk attenuation decreases with increasing frequency. In the case of the time division multiplex method with echo compensation, which utilizes the channel bandwidth optimally, from a certain speed the range is limited by the near-end crosstalk. The range can then be increased only by compensating for the near-end crosstalk, which requires considerable technical sophistication that cannot yet be realized. If the time division multiplex method is combined with the frequency division multiplex method, in which the transmission in the two directions takes place in different frequency bands, then although the required bandwidth is increased, the near-end cross-talk can be eliminated by suitable selective filtering. A precondition in this case is that all the signals transmitted in the same direction are transmitted in a multi-pair cable in the same frequency band. From speeds of a few Mbits and above, a greater range can be achieved with the frequency division multiplex method than with the time division multiplex method with echo compensation.

As the transmission method, the quadrature amplitude modulation method is taken as a basis. This enables a plurality of bits to be transmitted per symbol by means, for example, of quaternary or even higher encryption (cf. the textbook by K. D. Kammeyer "Nachrichtenubertragung" [Tele-communications], Stuttgart 1996, p. 372, FIGS. 11.1.2). According to the frequency division multiplex method, transmission in one direction takes place in a different frequency band from transmission in the other direction, in which case, in order to be able to eliminate the near-end crosstalk by selective filtering, the carrier frequencies for the two transmission directions are chosen in such a way that the two bands do not overlap.

At the receiver end, the received modulated signal has to be filtered out of the composite signal on the line and sampled at a suitable sampling frequency. The choice of sampling frequency has a very great influence on the realization complexity. The lower it can be chosen to be, the lower the complexity is with regard to processing speed and number of coefficients in the case of the digital filtering. The sampling frequency must be a multiple of the symbol rate. In addition, the known sampling theorem states that the sampling frequency must be at least twice as high as the maximum frequency of the sampled signal.

SUMMARY OF THE INVENTION

It is accordingly an object of the invention to provide a duplex data transmission method with QAM and a corresponding demodulator, which overcome the above-mentioned disadvantages of the heretofore-known devices and methods of this general type and which has a further reduced complexity in the case of demodulation and which achieves a reduction in the sampling frequency.

With the foregoing and other objects in view there is provided, in accordance with the invention, a method for duplex data transmission with quadrature amplitude modulation via two conductors using time division multiplex and frequency division multiplex methods of two oppositely transporting channels, which comprises:

modulating a carrier signal with two digital data signals;

transmitting the modulated signal in a first direction in an upper channel having a relatively higher frequency band $f_o \pm B_o/2$ and in a second direction in a lower channel having a relatively lower frequency band $f_u \pm B_u/2$, whereby the lower frequency band does not overlap the higher frequency band, and whereby each of the channels transports two digital signals, including a normal data signal and a quadrature data signal, at a respective symbol frequency $f_T$;

sampling the modulated carrier signal received via the upper channel at a sampling frequency $f_{Ao}$ and sampling the modulated carrier signal received via the lower channel at a sampling frequency $f_{Au}$;

subsequently demodulating a pulse train resulting from the sampling step; and subsequently low-pass filtering and sampling at the symbol frequency of the data signal for recovering the two digital data signals used for modulation at the respectively other end;

wherein the following frequencies are defined:
    $f_o$=center frequency of the upper channel;
    $B_o$=bandwidth of the upper channel;
    $f_u$=center frequency of the lower channel;
    $B_u$=bandwidth of the lower channel;
    $f_T$=symbol frequency of the digital data signal;
    $f_{Ao}$=sampling frequency of a receiver-end sampling of the upper channel prior to demodulation;
    $f_{Au}$=sampling frequency of the receiver-end sampling of the lower channel prior to demodulation;
and wherein:

$f_o > f_u, f_{Ao} > f_T, f_{Au} > f_T;$ $f_o/f_u$ is a rational number $K$; and $f_{Ao} = 2f_o.$ These relationships may be partly combined to require the ratio $f_o/f_u$ to be a rational number K>1.

By definition a rational number is a number which can be expressed as the quotient of two integers with a non-zero denominator.

In accordance with an added feature of the invention, a delay is introduced at the receiver end in the demodulation path of a respective one of the two data signals of at least one of the channels for phase-shifting the respective data signal with respect to a cyclic multiplier used for demodulation.

In accordance with an additional feature of the invention, the normal data signal and the quadrature data signal are brought into phase after demodulation by low-pass filtering with a do low-pass filter having a signal propagation time longer than a signal propagation time of a low-pass filter of another demodulation path by the same delay in the other of the two data signals.

In accordance with another feature of the invention, the rational number is an integer, and the delay may be set to $1/4f_o$.

In accordance with a combined feature of the invention, $f_{Ao}=2\cdot f_o$, the delay in the quadrature path of the upper channel amounts to $1/4f_o$, and the rational number is an integer.

In accordance with a further feature of the invention, during a demodulation of the upper channel, the sampling is split between two locations by sampling, prior to introducing the delay, at a sampling frequency ($2f_{Ao}$) twice the regular sampling frequency and, after introducing the delay, sampling each of the demodulation paths again at the regular sampling frequency $f_{Ao}$.

In accordance with again a further feature of the invention, the rational number is set to K=2.

In accordance with again another feature of the invention, the rational number (K) is set to be an odd integer, and during the demodulation of the lower channel, the sampling is split between two locations. This is done by sampling, prior to introducing the delay, at the doubled sampling frequency $2f_{Ao}$ and, after introducing the delay, sampling each of the demodulation paths again at the regular sampling frequency $f_{Ao}$.

In accordance with a concomitant feature of the invention, the delay is introduced in the quadrature demodulation path in the lower channel in an amount of $K/4f_o$.

With the above and other objects in view there is provided, in accordance with the invention, a demodulator for use in the above outlined method for use in the upper channel or the lower channel, having a respective demodulation path for the normal signal and the quadrature signal. The demodulator comprises a first sampler for sampling at a sampling frequency, a multiplier connected to the first sampler for multiplying by a cyclic signal, a low-pass filter connected to the multiplier, a second sampler for sampling at the symbol frequency, and a delay element connected to an input of the first sampler.

In other words, the demodulator may be specially equipped for specific method implementations in that the delay element is placed upstream of the input of the first sampler.

By virtue of the fact that a rational ratio exists between the upper and lower carrier frequencies, an only finite number of values are obtained for the cosine and sine values of the lower carrier oscillations, and they can be stored in a read-only memory. The sampling frequency can be reduced to twice the center frequency of the respective upper channel, even though the sampling theorem is apparently violated in this case. This is possible because the spectral components of the upper channel which are superimposed on one another during sampling have fully symmetrical signal components with respect to the upper center carrier frequency owing to the modulation.

In the case of specific configurations, the situation might arise whereby during demodulation by multiplication by cyclic values, these values regularly correspond to the zero crossing. The sampled value would then be regularly multiplied by zero and the relevant data signal could not be recovered in this way. This problem is solved in that a delay by a time $t_v$ is introduced at the receiver end in the demodulation path of in each case one of the two data signals of at least one of the components, that is to say normal or quadrature components, for the purpose of phase-shifting it with respect to the cyclic multiplier used for demodulation. The multiplications are then carried out with values that are not equal to zero. The additionally introduced delay can be compensated for again in that the normal and quadrature data signals are brought in phase again after demodulation in that a low-pass filter whose signal propagation time is longer than the signal propagation time of the low-pass filter of the other demodulation path by the delay that has been introduced is used for that demodulation path of the channel which has not been allocated the delay.

Specific preferred configurations are produced if the rational number K is chosen to be an integer, where it is necessary in turn to decide whether the integer is even or odd; preferred values are K=2 or K=3. The delay that is to be introduced and is dependent on the frequencies chosen amounts for example to K times a quarter period of the carrier signal. There may be cases in which it is advantageous if during the demodulation of the upper or lower channel, the sampling is split between two locations in that, prior to the introduction of the delay, sampling is effected at a sampling frequency twice that of the regular sampling and, after the introduction of the delay, each of the demodulation paths is sampled again at the regular sampling frequency $f_{Ao}$.

Other features which are considered as characteristic for the invention are set forth in the appended claims.

Although the invention is illustrated and described herein as embodied in a method for duplex data transmission with QAM and demodulator for use in this method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic view of a duplex data transmission link with two digital transceivers;

FIG. 2 is a graph illustrating the two transmission frequency bands;

FIG. 3 is a schematic circuit diagram of the two demodulators for a given frequency ratio;

FIG. 4 is a schematic circuit diagram of the two demodulators for a different given frequency ratio;

FIG. 5 is a schematic circuit diagram of the two demodulators for a specific frequency ratio K=3;

FIG. 6 is a graph with illustrations corresponding to FIG. 2 for frequency bands in accordance with given examples;

FIG. 7 are graphs of impulse responses at various locations in the circuit of the first example;

DESCRIPTION OF THE PREFERRED EMBODIMENTS

Figure 8:
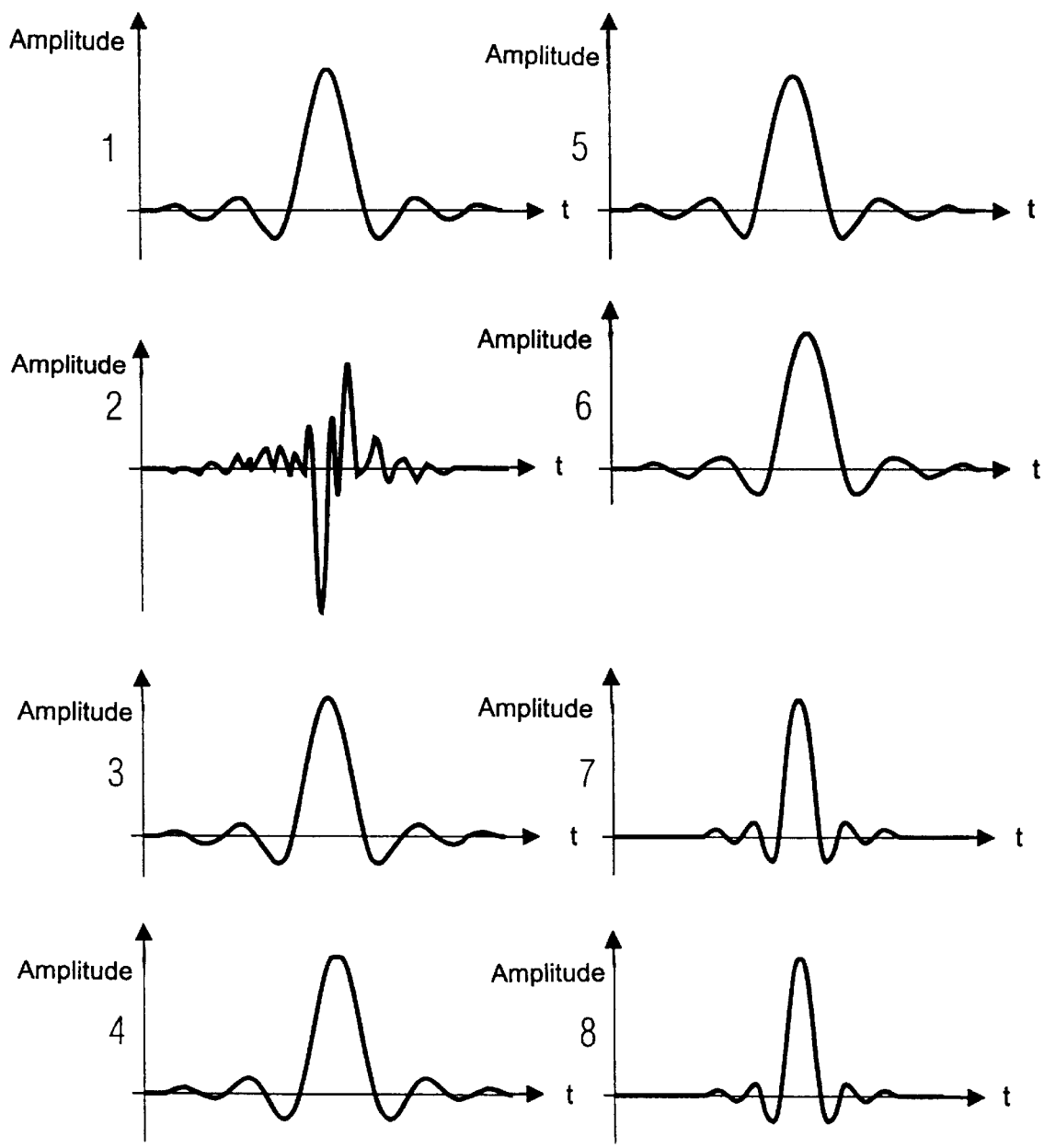
FIG. 8 are graphs of impulse responses at various locations in the circuit of the second example.
Figure 9:
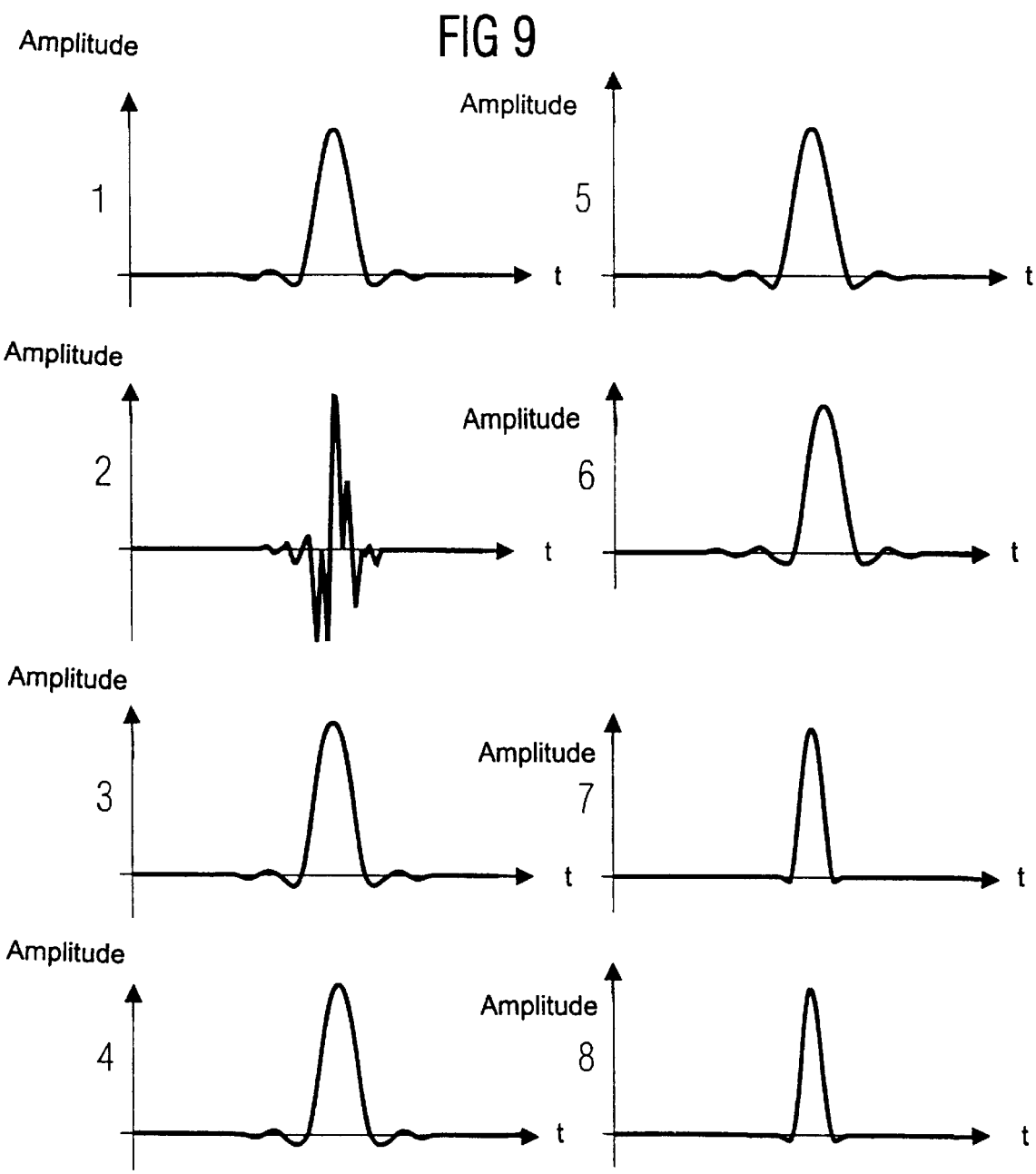
FIG. 9 are graphs of impulse responses at various locations in the circuit of the third example.
Figure 10:
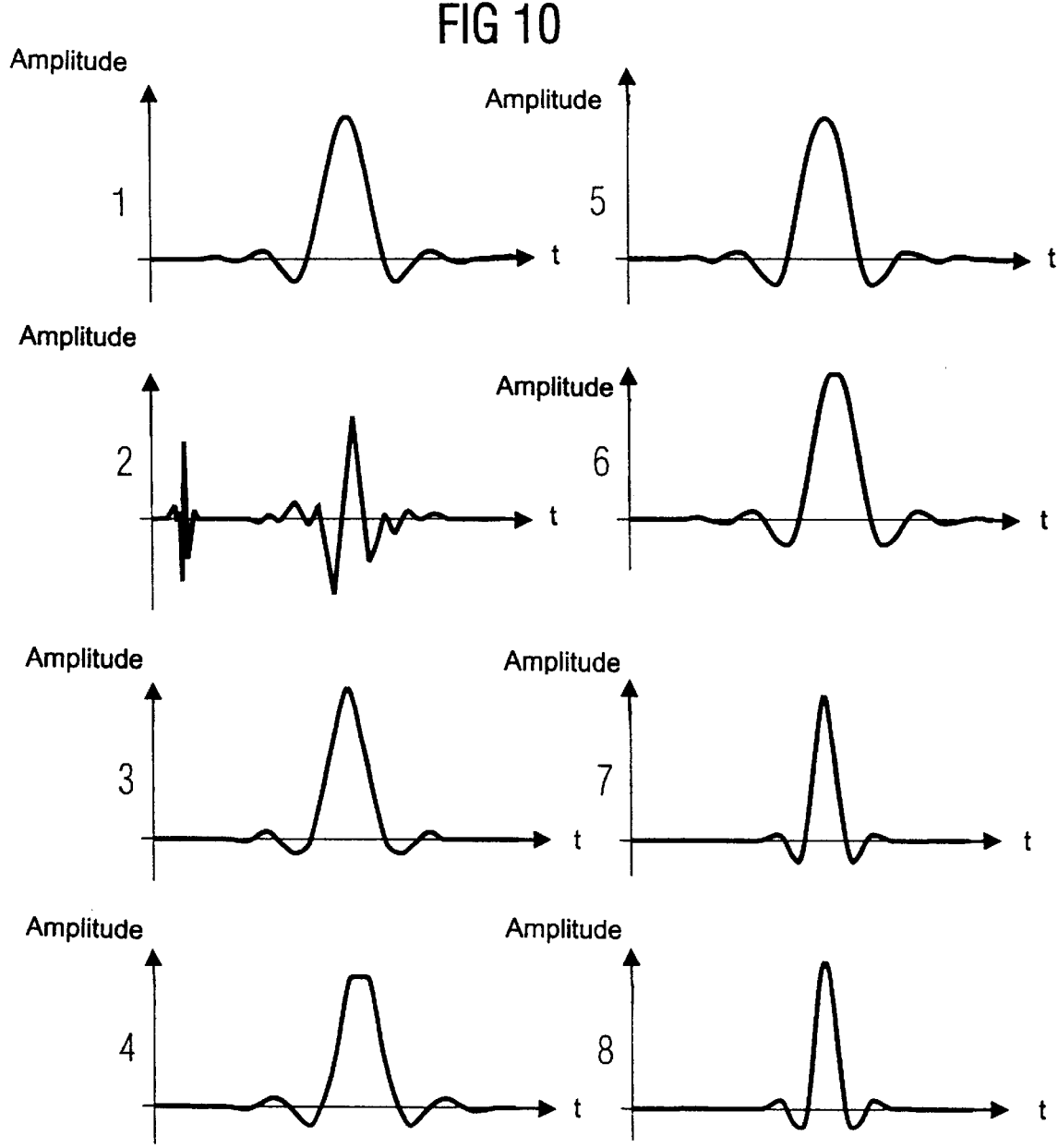
FIG. 10 are graphs of impulse responses at various locations in the circuit of the fourth example.

Referring now to the figures of the drawing in detail and first, particularly, to FIG. 1 thereof, there is seen a duplex data transmission link for operation with quadrature amplitude modulation, having a two-wire line 1 connecting a first transceiver 2 to a second transceiver 3. The transceiver 2 comprises a transmitter 4 and a receiver 5, and the transceiver 3 comprises a transmitter 6 and a receiver 7. Via the line 1, a first, "upper" channel 10 runs from the transmitter 4 to the receiver 7, and a second, "lower" channel 11 runs from the transmitter 6 to the receiver 5. The upper channel 10 uses an upper frequency band around a center frequency $f_o$ and the lower channel 11 uses a lower frequency band around a center frequency $f_u$. The frequency band of the upper channel 10 has a width of $B_o$ and the frequency band of the lower channel 11 has a width of $B_u$. As is illustrated in FIG. 2, the two frequency bands do not overlap. In the case of an analog line, D/A converters and A/D converters are connected in between the line and the transmitters and receivers, if appropriate also only downstream of the filters 17 and 18.

Each channel contains two components, namely a normal data signal and a quadrature data signal, which each comprise digital symbol series with a symbol frequency $f_T$.

The modulated signal placed by the transmitter 4 onto the upper channel 10 on the line 1 is composed of the two signal components according to the following relationship:

$$x(t) = \sum_{k=0}^{\infty} a_k \cdot h(t-kT) \cdot \cos(2\pi f_o t) + \sum_{k=0}^{\infty} b_k \cdot h(t-kT) \cdot \sin(2\pi f_o t)$$

where the values $a_k$ and $b_k$ designate the characters to be transmitted, h(t) designates the impulse response of a low-pass filter 15 in the transmitter and $f_o$ designates the center carrier frequency in the channel 10.

The modulated signal passed by the transmitter 6 to the lower channel 11 is constructed analogously to the signal of the channel 10.

FIG. 1 also shows the receiver structure. A reception filter 17 in the receiver 5 and a reception filter 18 in the receiver 7 suppress the interfering components of the dedicated transmission signal and also the near-end crosstalk, the components of which must lie in the same frequency band as the transmission signal. Therefore, the filter 17 inhibits the band $f_o \pm B_o/2$ of the upper channel 10 and transmits the band $f_u \pm B_u/2$ of the lower channel 11, and the filter 18 inhibits the band $f_u \pm B_u/2$ of the lower channel 11 and transmits the band $f_o \pm B_o/2$ of the upper channel 10. Owing to the line attenuation of the reception signal that is to be bridged, relatively high stop-band attenuation values have to be demanded for the reception filters. In this case, owing to the high stop-band attenuation requirements, it is permissible and expedient to dimension the reception filter in such a way, for realization reasons, that only some of the interfering components are suppressed. The remaining interfering components can then be filtered out after demodulation in the baseband.

After the interfering echo and near-end crosstalk components have been filtered out, the reception signal has to be demodulated. In a demodulator 21 and 22, respectively, the bandpass signals are transformed again into the baseband, with the result that the two components, namely normal component with the symbols a and quadrature component with the symbols b, are produced again at the output. After equalization in an equalizer 24, the transmitted data can be recovered again with the aid of a decision circuit 25 in the event of interference-free transmission. In addition, devices for carrier phase regulation and clock recovery are also necessary, but are not indicated in FIG. 1.

In the demodulator 21 and 22, respectively, firstly the filtered reception signal must be sampled at a suitable sampling frequency by a sampler 27. For technical equipment reasons, this sampling frequency is chosen to be as low as possible. It amounts to $f_{Ao}$ in the demodulator 22 for the channel 10 and $f_{Au}$ in the demodulator 21 for the channel 11. The two frequencies may be identical but do not have to be.

Then, in a description relating to the receiver 7, the sampled reception signal is multiplied, in multipliers 28, on the one hand by a cyclic signal at the carrier frequency $f_o$ having the profile $\cos(2\pi f_o t)$, and on the other hand by the orthogonal signal $\sin(2\pi f_o t)$. After low-pass filtering in a respective low-pass filter 29 for the purpose of suppressing the interfering components, arising in the course of the multiplication, having twice the carrier frequency and the remaining components of the dedicated echo and also the near-end crosstalk, the desired baseband components are obtained and are fed to the equalizer 24 after sampling at the symbol frequency $f_T$ in a sampler 30.

The sampling frequency $f_{Ao}$ of the sampler 27 must be a multiple of the modulation rate, that is to say of the symbol frequency, and in principle, moreover, should be chosen to be high enough that the sampling theorem is not violated. Under the assumptions made here, the spectrum of the reception signal in accordance with FIG. 2 extends as far as the maximum frequency of $f_o \pm B_o/2$, with the result that the sampling frequency should accordingly be greater than $2(f_o \pm B_o/2)$. In this case, Bo designates the bandwidth of the upper channel. Within the scope of the invention, the sampling frequency can be reduced to $2f_o$, even though the sampling theorem is apparently violated in this case. This is possible because the spectral components of the upper channel that are superposed on one another during sampling have fully symmetrical signal components with respect to the upper carrier center frequency owing to the modulation. The condition whereby the sampling frequency must be a multiple of the symbol frequency must furthermore be met.

After sampling at $f_{Ao}=2f_o$, the samples have to be multiplied by the corresponding values of the two orthogonal carrier signals. The values obtained in this case, for the upper channel 10, are the values $\cos(2\pi \cdot f_o \cdot i/2f_o)$ or $\cos(\pi \cdot i)$, where $i=0, 1, 2, \ldots$, and, correspondingly, $\sin(\pi \cdot i$ for the quadrature path, that is to say the values $+1, -1, +1, -1 \ldots$ for the normal path and the values $0, 0, 0, \ldots$ for the quadrature path. Consequently, the quadrature path cannot be recovered in this way. However, if an input sequence which is shifted by a quarter period of the upper carrier oscillation is used for the demodulation of the quadrature path, then the following is obtained for the samples of the carrier signal $$\sin(2\pi \cdot f \cdot (i/2f_o + 1/4f_o)) = \cos(\pi \cdot 1$$

that is to say likewise the values $+1, -1, +1, -1, \ldots$. This shifting is effected in a delay element 31, which introduces a delay $t_v$ of $1/(4f_o)$. The propagation time difference in the two paths which results from the shift operation has to be compensated for again in the course of the subsequent delay in the course of the low-pass filtering in the filter 29. Therefore, two different low-pass filters 29 are necessary, the propagation times of which differ from one another by $1/4f_o$. At the filter output, the signals that have been subsampled at the symbol rate are forwarded to the equalizer 24 for further processing.

A corresponding procedure has to be adopted in the course of reception in the lower channel 11. The samples of the lower carrier signal can be described as follows:

$$\cos(\pi(f_u/f_o) \cdot i) \text{ and } \sin(\pi(f_u/f_o) \cdot i$$

After the multiplication of the reception values sampled at $f_A=2f_o$ by the samples of the two orthogonal carrier oscillations and low-pass filtering, the two baseband components are obtained again, which components are sampled at the symbol frequency=the signal element timing and are forwarded to the equalizer.

According to the invention, a rational ratio, that is to say a ratio which can be expressed as a quotient of two integers, exists between the upper and lower center carrier frequencies. Consequently, only a finite number of values are obtained for the two carrier oscillations $\cos(\pi(f_u/f_o) \cdot i)$ and $\sin(\pi(f_u/f_o) \cdot i$, which can be stored in a read-only memory.

This leads to a simplification. If the upper carrier frequency is an integer multiple of the lower carrier frequency, that is to say $f_o = K \cdot f_u$, then the following can be written for the carrier oscillations $$\cos(i \cdot \pi/k) \text{ and } \sin(i \cdot \pi/k.$$

The samples temporally shifted by a quarter period can be processed here in the upper quadrature path in the same way as in the upper normal path. They must then be multiplied by the sine values $$\sin(2\pi \cdot f_o \cdot (i/2f_o + 1/4f_o)) = \cos(\pi \cdot i,$$

that is to say the multipliers for the normal and quadrature paths are identical. The propagation time difference can again be compensated for by corresponding dimensioning of the downstream low-pass filters.

Figure 11:
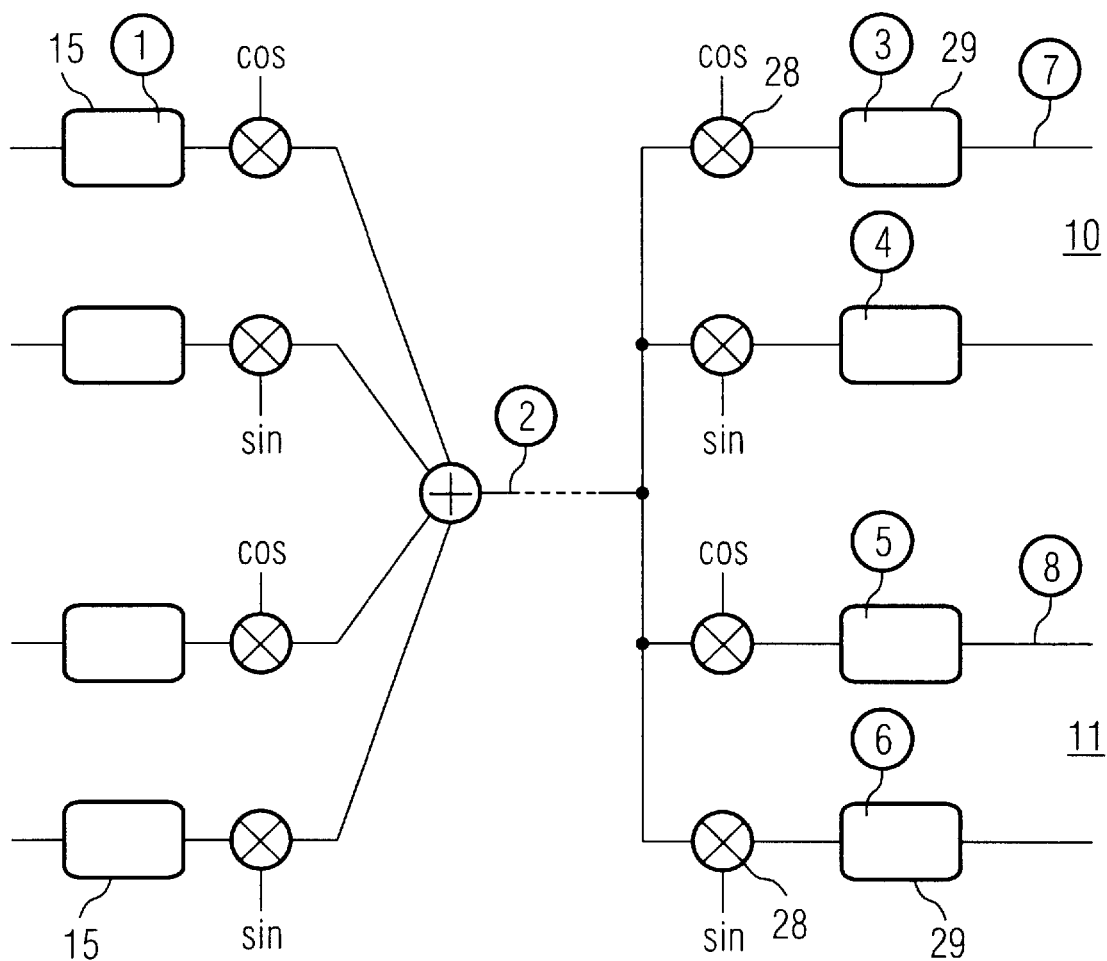
FIG. 11 is a schematic block diagram of the configuration in accordance with the first to fourth examples with indication of the points for which the impulse responses are illustrated in FIGS. 7 to 10.

Given a sampling frequency of $2f_o$ and an integer ratio of upper and lower cut-off frequency $f_o = K \cdot f$, the samples for the quadrature path have to be shifted by $t_v = 2 \cdot f_o/4f_u = K/2$. This is only possible with K being even. A block diagram of the demodulator for even K is illustrated in FIG. 3. The illustration of FIG. 3 and of the subsequent FIGS. 4, 5 and 11 is rotated through 90° in comparison with FIG. 1; only the two demodulators are illustrated here. With odd K, the reception signal must firstly be sampled at twice the sampling frequency $4f_o$ as in the upper channel. The samples are then fed directly to the normal path and the samples shifted by K sampling clock signals are fed to the quadrature path. The corresponding circuit diagram of the demodulator for an odd K is illustrated in FIG. 4. The delay time tv is indicated in the drawing. After the acceptance of every second value of the two sampling sequences (sampling at $2f_o$), the demodulation is effected by multiplication by the values $\cos(i \pi/K)$ and low-pass filtering. The baseband signals obtained in this way are then subsampled with the symbol clock signal in the sampler 30 before being forwarded to the equalizer 24.

For the special case of K=3, the following values result for the carrier oscillation: $\cos(i \pi/3) = \{1, 0.5, -0.5, -1, -0.5, 0.5, 1, \ldots\}$. If an additional shift is effected by $1/f_o$, the following values are obtained: $\cos(i \pi/3 + 1/2) = \{0.87, 0, -0.87, -0.87, 0, 0.87, 0.87, 0 \ldots\}$. Since this shift or delay by delay times $t_v$ as indicated in the drawing is effective both in the normal path and in the quadrature path, it does not need to be compensated for in the low-pass filters 29; the compensation is effected by correspondingly readjusting the sampling clock signal.

Finally, the values of the carrier oscillation can also be normalized to one, with the result that the reception values need only be multiplied by $\{1, 0, -1, -1, 0, 1, 1, 0, -1, -1, 0, \ldots\}$.

FIG. 5 shows the corresponding block diagram of the demodulator for a transmission system where K=3.

The above-described method will now be explained in somewhat more detail using a number of application examples. These involve systems which enable transmission to be effected with a speed of 25.92 Mbit/s in one direction and with 12.96 Mbit/s in the other direction. The table below shows, for four application examples, the corresponding values for the modulation rate, carrier frequency and also the roll-off factor of the low-pass filters 29 in each case for the upper and lower channel. In this case, of course, other speeds can also be realized given corresponding alteration of the number of bits per symbol (designated by n in the table) or of the symbol frequency with the conditions being maintained.

| Lower channel | | | | | Upper channel | | | | | 2fo --- $f_T$ lower channel | 2fo --- $f_T$ upper channel | fo --- = K fu |
|---|---|---|---|---|---|---|---|---|---|---|---|---|
| Bit rate Mbit/s | Bit/ Symbol n | Roll-off factor | Symbol Frequency Mbaud $f_T$ | Carrier Frequency MHz | Bit rate Mbit/s | Bit/ Symbol n | Roll-Off factor | Symbol Frequency Mbaud $f_T$ | Carrier Frequency MHz | | | |
| 25.92 | 4 | 0.4 | 6.48 | 4.86 | 12.96 | 1 | 0.4 | 12.96 | 19.44 | 6 | 3 | 4 |
| 25.92 | 4 | 0.2 | 6.48 | 4.86 | 12.96 | 2 | 0.2 | 6.48 | 12.96 | 4 | 4 | 2.67 |
| 25.92 | 4 | 0.85 | 6.48 | 6.48 | 12.96 | 2 | 0.85 | 6.48 | 19.44 | 6 | 6 | 3 |
| 12.96 | 4 | 0.4 | 2.16 | 2.16 | 25.92 | 2 | 0.4 | 12.96 | 12.96 | 12 | 2 | 6 |

The corresponding spectra for the upper and lower channels are illustrated in FIG. 6. Components of identical magnitude in each of the two channels are assumed in this case. In practical applications, the components are dependent on the crosstalk of the transmission signal to the receiver input, on the near-end crosstalk and on the line attenuation.

In the framework of the four examples, firstly digital transmission filters were designed taking account of the corresponding modulation rates and roll-off factors. In this case, a root roll-off profile was taken as a basis in order to divide the signal shaping uniformly between transmitter and receiver. The transmission signal is composed of the four individual pulses in the examples. This transmission signal is passed as reception signal to the demodulator 21 and 22, respectively, at the receiver end. The individual impulse responses are obtained at the output of the demodulator, which impulse responses are not permitted to influence one another. The digital reception filters were designed in accordance with the symbol frequencies (modulation rates), the roll-off factors and the propagation time shifts described.

FIGS. 7 to 10 show the impulse responses of the low-pass filters 29 and also the transmission pulse and the impulse responses at the demodulator output of the normal path. The corresponding reference points can be gathered from FIG. 11. The time axis was chosen in each case in such a way as to allow a complete pulse to be illustrated (in each case 20 T). For this reason, the absolute times do not correspond in the case of different symbol periods or modulation rates. The required propagation time differences of the reception filters are clearly evident in FIGS. 7 to 10. Furthermore, the figures reveal that the impulse responses at the demodulator output do not influence one another.

FIGS. 7 to 10 illustrate the impulse response in each case at eight points in the circuit for the four examples. These impulse responses are designated by 1 to 8 in FIGS. 7 to 10 and are marked by corresponding encircled numerals in FIG. 11. Accordingly, the following impulse responses are illustrated:

1) Impulse response of the transmission low-pass filters 15 at a sampling frequency $f_A = 4f_o$.
2) Impulse responses at the transmitter output in the event of pulse excitation in the upper and lower channels (normal and quadrature components).
3) Impulse response of the digital reception low-pass filter 29, upper channel, normal component, at a sampling frequency $f_{Ao} = 2f_o$.
4) Impulse response of the digital reception low-pass filter 29, upper channel, quadrature component, at a sampling frequency $f_{Ao} = 2f_o$.
5) Impulse response of the digital reception low-pass filter 29, lower channel, normal component, at a sampling frequency $f_{Au} = 2f_o$.
6) Impulse response of the digital reception low-pass filter 29, lower channel, quadrature component, at a sampling frequency $f_{Au} = 2f_o$.
7) Impulse response at the demodulator output, upper channel, normal component, the lower channel having been filtered out.
8) Impulse response at the demodulator output, lower channel, normal component, the upper channel having been filtered out.

I claim:

1. A method for duplex data transmission with quadrature amplitude modulation in oppositely transporting channels, which comprises:

modulating a first carrier signal with a first normal digital data signal and a first quadrature digital data signal at a first symbol frequency $f_T^{(o)}$ for generating a first modulated carrier signal;

transmitting the first modulated carrier signal in a first direction in an upper channel having a relatively higher frequency band $f_o \pm B_o/2$;

modulating a second carrier signal with a second normal digital data signal and a second quadrature digital data signal at a second symbol frequency $f_T^{(u)}$ for generating a second modulated carrier signal;

transmitting the second modulated carrier signal in a second direction in a lower channel having a relatively lower frequency band $f_u \pm B_u/2$, the lower frequency band not overlapping the higher frequency band;

sampling the first modulated carrier signal received via the upper channel at a sampling frequency $f_{Ao}$ and sampling the second modulated carrier signal received via the lower channel at a sampling frequency $f_{Au}$;

subsequently demodulating a pulse train resulting from the sampling step; and subsequently low-pass filtering and sampling at the symbol frequency of the respective digital data signal for recovering the first and second normal and quadrature digital data signals used for modulation;

wherein the following frequencies are defined:
  $f_o$ = center frequency of the upper channel;
  $B_o$ = bandwidth of the upper channel;
  $f_u$ = center frequency of the lower channel;
  $B_u$ = bandwidth of the lower channel;
  $f_T$ = symbol frequency of the digital data signal;
  $f_{Ao}$ = sampling frequency of a receiver-end sampling of the upper channel prior to demodulation;
  $f_{Au}$ = sampling frequency of the receiver-end sampling of the lower channel prior to demodulation;

and wherein:

$f_o > f_u$, $f_{Ao} > f_T$, $f_{Au} > f_T$;

$f_o/f_u$ is a rational number; and $f_{Ao} = 2f_o$.

2. The method according to claim 1, which comprises introducing a delay at the receiver end in one demodulation path of either the normal digital data signal or the quadrature digital signal of at least one of the channels for phase-shifting the respective digital data signal with respect to a cyclic multiplier used for demodulation.

3. The method according to claim 2, which comprises bringing into phase the normal digital data signal and the quadrature digital data signal after demodulation by low-pass filtering with a low-pass filter in another demodulation path of either the normal digital data signal or the quadrature digital signal having a signal propagation time longer than a signal propagation time of a low-pass filter of the one demodulation path of either the normal digital data signal or the quadrature digital signal by the delay in the one demodulation path.

4. The method according to claim 1, wherein the rational number K is an integer.

5. The method according to claim 2, wherein the delay is set to $1/4f_o$ and the rational number K is an integer.

6. The method according to claim 3, wherein the delay is set to $1/4f_o$ and the rational number K is an integer.

7. The method according to claim 2, wherein $f_{Ao} = 2 \cdot f_o$, the delay in the quadrature path of the upper channel amounts to $1/4f_o$, and the rational number K is an integer.

8. The method according to claim 3, wherein $f_{Ao} = 2 \cdot f_o$, the delay in the quadrature path of the upper channel amounts to $1/4f_o$, and the rational number K is an integer.

9. The method according to claim 8, which comprises, during a demodulation of the upper channel, splitting the sampling between two locations by sampling, prior to introducing the delay, at a sampling frequency twice a regular sampling frequency and, after introducing the delay, sampling each of the demodulation paths again at the regular sampling frequency $f_{Ao}$.

10. The method according to claim 9, which comprises setting the rational number K=2.

11. The method according to claim 2, which comprises setting the rational number K to be an odd integer, and during the demodulation of the lower channel, splitting the sampling between two locations by sampling, prior to introducing the delay, at a sampling frequency twice a regular sampling frequency and, after introducing the delay, sampling each of the demodulation paths again at the regular sampling frequency $f_{Ao}$.

12. The method according to claim 11, which comprises introducing the delay in the quadrature demodulation path in the lower channel in an amount of $K/4f_o$.

13. A demodulator for use in the method according to claim 3 for one of the upper channel and the lower channel, having a respective demodulation path for the normal signal and the quadrature signal, comprising: a first sampler for sampling at a sampling frequency, a multiplier connected to said first sampler for multiplying by a cyclic signal, a low-pass filter connected to said multiplier, a second sampler for sampling at the symbol frequency, and a delay element connected to an input of said first sampler.

* * * * *